United States Patent [19]

Webber

[11] E Re. 28,470

[45] Reissued July 8, 1975

[54] POROUS METAL STRUCTURE

[75] Inventor: Harold H. Webber, Groton, Mass.

[73] Assignee: Brunswick Corporation, Skokie, Ill.

[22] Filed: June 6, 1974

[21] Appl. No.: 477,101

Related U.S. Patent Documents

Reissue of:

[64] Patent No.: 3,469,297
Issued: Sept. 30, 1969
Appl. No.: 543,980
Filed: Apr. 20, 1966

[52] U.S. Cl. ..... 29/180 R; 29/183.5; 29/191; 29/419

[51] Int. Cl..... B32b 5/26; B32b 15/18; B32p 17/06

[58] Field of Search ... 29/180 R, 180 S, 183, 183.5, 29/191, 191.2, 191.4, 192, 194, 419

[56] References Cited

UNITED STATES PATENTS

| | | | |
|---|---|---|---|
| 301,779 | 7/1884 | Wells | 29/180 X |
| 1,490,544 | 4/1924 | Stern | 29/183 X |
| 1,572,342 | 2/1926 | Wiltsey | 29/419 |
| 1,904,026 | 4/1933 | Field | 29/180 X |
| 2,172,767 | 9/1939 | Levine et al. | 29/419 |
| 2,616,165 | 11/1952 | Brennan | 29/183 |
| 2,683,500 | 7/1954 | Goodloe | 183/45 |
| 3,053,713 | 9/1962 | Juras | 29/180 |
| 3,087,233 | 4/1963 | Turnbull | 29/182 |
| 3,504,516 | 4/1970 | Sundberg | 72/203 |
| 3,505,083 | 4/1970 | Luksch et al. | 29/183.5 |

*Primary Examiner*—L. Dewayne Rutledge
*Assistant Examiner*—E. L. Weise
*Attorney, Agent, or Firm*—John G. Heimovics; Donald S. Olexa; John J. Connors

[57] ABSTRACT

A porous metal structure made from a plurality of relatively short fracture-free substantially non-straight rough surfaced metal fibers distributed in either a two-dimensional or a three-dimensional orientation. The fibers have preselected cross sections with the porous structure containing either uniform cross-section fibers or different cross-sectioned fibers. The fibers may be in a stress relieved condition or a cold worked condition. The porous metal structure fibers have a mean cross-sectional dimension of under approximately fifty microns and said fibers have an average length of at least approximately two inches.

2 Claims, 21 Drawing Figures

Fig. 1.
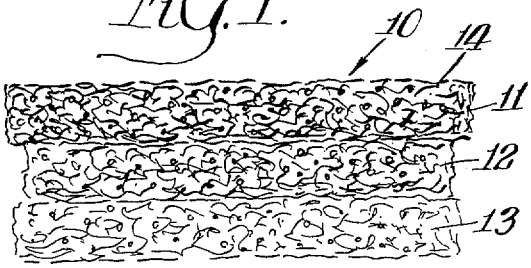
Fig. 2.
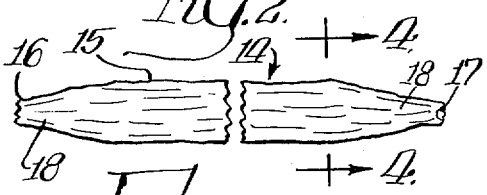
Fig. 3.
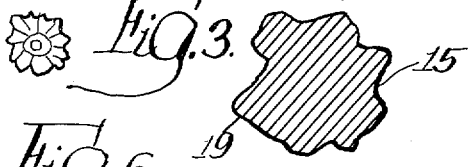
Fig. 5.
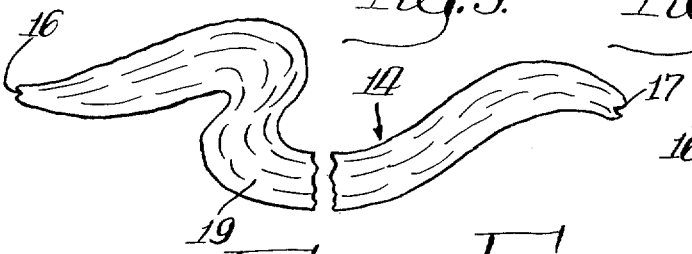
Fig. 6.
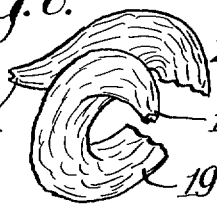
Fig. 4.
Fig. 7.
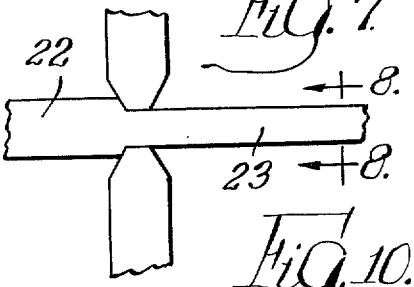
Fig. 8.
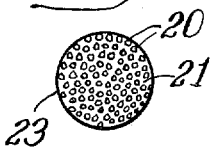
Fig. 9.
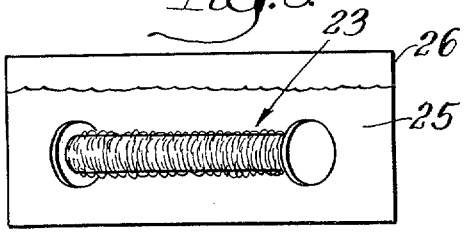
Fig. 10.
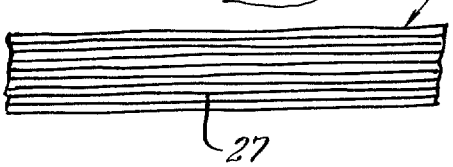
Fig. 12.
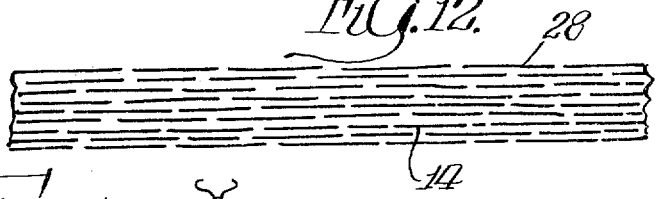
Fig. 11.
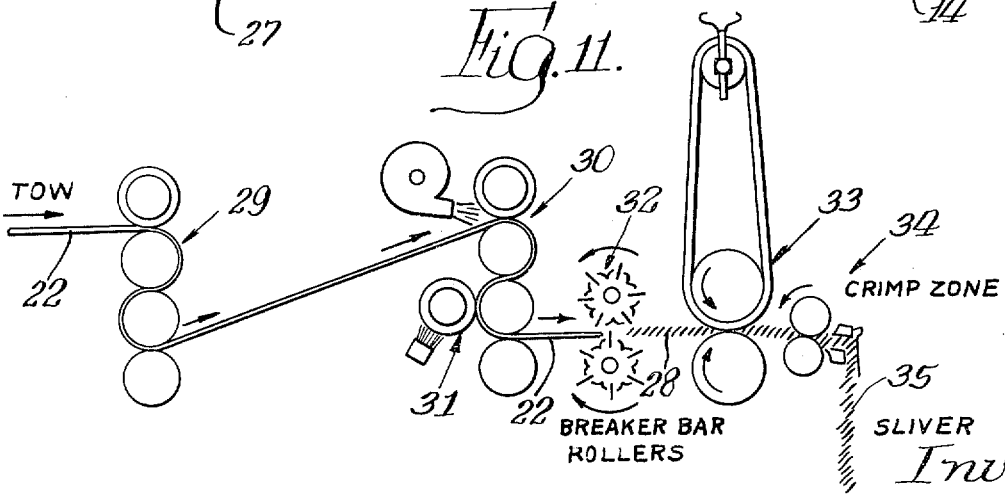
Inventor:-
Harold H. Webber,
By Hofgren, Wegner, Allen, Stellman & McCord,
Attys.

POROUS METAL STRUCTURE

Matter enclosed in heavy brackets [ ] appears in the original patent but forms no part of this reissue specification; matter printed in italics indicates the additions made by reissue.

---

This invention relates to textiles and in particular to metal fiber webs.

In one form of textile material the fibers are arranged as a coherent web and retained therein by either an entanglement of the respective fibers or a bonding thereof together without firstly spinning the fibers into yarns and interlacing the yarns by the conventional textile operations of weaving, knitting, braiding, and the like. Examples of different types of such nonwoven fibrous materials are nonwoven textiles, wool blend felts, needled and shrunk felts, and battings. Where the fibers are parallel laid the nonwoven fabric is conventionally referred to as a unidirectional fabric, and where the fibers are random laid, the fabric is referred to as an isotropic fabric. Bonding of thermoplastic fibers may be accomplished by application of heat and pressure. Another conventional method of bonding the fibers is by means of a liquid adhesive or binder. The use of binders has presented a number of problems, such as requiring curing to provide water insolvent resistance, poor light stability, discoloration, and gradual stiffening.

The present invention is concerned with the provision of a nonwoven material which eliminates the disadvantages of the known conventional nonwoven materials, and which provides an improved porous metal structure of unique characteristics.

Thus, a principal feature of the present invention is the provision of a new and improved porous metal structure.

Another feature of the invention is the provision of a porous metal structure formed of metal fibers of extremely small size.

A further feature of the invention is the provision of a porous metal structure wherein the fibers are interlocked in intermingled relationship substantially solely by means of rough outer surfaces thereof in friction engagement.

Still another feature of the invention is the provision of such a porous metal structure wherein the individual fibers are curled in a number of different directions.

A further feature of the invention is the provision of a porous metal structure wherein the fibers are curled about mutually nonparallel axes.

A still further feature of the invention is the provision of a porous metal structure wherein the fibers define a card web.

A yet further feature of the invention is the provision of a porous metal structure wherein the fibers define a plurality of superposed interlocking card webs.

A further feature of the invention is the provision of a porous metal structure wherein the individual fibers are unmachined.

Still another feature of the invention is the provision of a porous metal structure wherein the individual fibers are unburnished.

A further feature of the invention is the provision of such a porous metal structure wherein the individual fibers are at least approximately 85% cold worked.

Another feature of the invention is the provision of a porous metal structure wherein the fibers have high compressional resilience.

Still another feature of the invention is the provision of a porous metal structure wherein the fibers comprise stress relieved, annealed fibers.

Yet another feature of the invention is the provision of a porous metal structure wherein the fibers have a cross-section of less than 12 microns.

A further feature of the invention is the provision of a porous metal structure wherein the fibers have substantially uniform cross-section between their ends.

Still another feature of the invention is the provision of a porous metal structure wherein the fibers are substantially similar in cross-sectional area.

Another feature of the invention is the provision of a porous metal structure wherein the fibers have preselected different cross-sectional areas.

A further feature of the invention is the provision of a porous metal structure wherein the fibers are provided in layers wherein the fibers of the respective layers have different preselected cross-sectional areas.

A yet further feature of the invention is the provision of a porous metal structure wherein the fibers engage each other substantially solely tangentially.

Yet another feature of the invention is the provision of such a porous metal structure wherein the fibers engage each other with substantially only point contacts.

Still another feature of the invention is the provision of a porous metal structure wherein the fibers are provided in layers wherein the fibers of successively different layers have progressively smaller cross-sectional areas.

Another feature of the invention is the provision of a porous metal structure wherein the fibers are provided in layers wherein the interstices between fibers of the respective layers have different cross-sectional areas.

A further feature of the invention is the provision of a porous metal structure wherein the fibers have an average length of at least approximately two inches.

A still further feature of the invention is the provision of a porous metal structure wherein the fibers are arranged in a compacted arrangement.

Another feature of the invention is the provision of a porous metal structure wherein the fibers are disposed in a felt arrangement.

Yet another feature of the invention is the provision of such a porous metal structure which is creped to have a preselected resilient extensibility.

Still another feature of the invention is a provision of a porous metal structure comprising a flexible sheet.

A further feature of the invention is the provision of a porous metal structure comprising a flexible sheet capable of being folded on itself without breakage of the fibers.

A yet further feature of the invention is the provision of a porous metal structure comprising a drapable sheet.

Another feature of the invention is the provision of a porous metal structure wherein the fibers are provided with niched ends.

Still another feature of the invention is the provision of a porous metal structure wherein the fibers comprise tension broken staples.

Yet another feature of the invention is the provision of a porous metal structure wherein the fibers are air laid.

Another feature of the invention is the provision of a porous metal structure wherein the fibers are annealed.

Other features and advantages of the invention will be apparent from the following description taken in connection with the accompanying drawings wherein:

FIG. 1 is a fragmentary section of a porous metal structure embodying the invention;

FIG. 2 is a fragmentary side elevation of a metal fiber for use therein;

FIG. 3 is an end elevation of the fiber of FIG. 2;

FIG. 4 is a transverse section thereof taken substantially along the line 4—4 of FIG. 2;

FIG. 5 is a broken side elevation of another form of metal fiber for use in the porous metal structure;

FIG. 6 is an end elevation of the fiber of FIG. 5;

FIG. 7 is a schematic illustration of one step in a method of forming the metal fibers;

FIG. 8 is a transverse section taken substantially along the line 8—8 of FIG. 7;

FIG. 9 is a schematic representation of another step in the forming of the metal fibers;

FIG. 10 is a side elevation of a tow of metal filaments formed as by the steps of FIGS. 7 through 9;

FIG. 11 is a schematic side elevation of an apparatus for breaking the filaments illustrated in FIG. 10 into fiber lengths;

FIG. 12 is a side elevation of a tow of the filaments broken into such fiber lengths;

Figure 13:
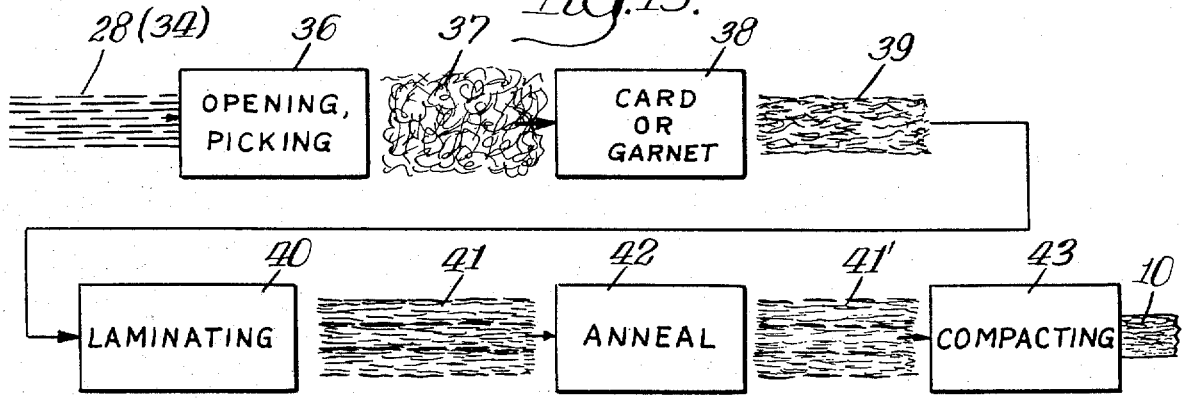
FIG. 13 is a schematic block diagram illustrating one method of forming a porous metal structure from the fibers of FIG. 12.

In the exemplary embodiment of the invention as disclosed in FIG. 1 of the drawing, a porous metal structure generally designated 10 is shown to comprise a plurality of webs 11, 12 and 13 of metal fibers 14. The metal fibers 14 comprise essentially fracture free metal fibers, each having a radially substantially symmetrical cross-section of less than 50 microns. The metal fibers 14 are interlocked in an intermingled relationship on the structure 10 substantially solely by means of the rough outer surfaces thereof in frictional engagements. Thus, the porous metal structure 10 provides a nonwoven web material eliminating the need for bonding material to maintain the integrity thereof.

The present invention comprehends the provision of such a porous metal structure having a preselected fiber distribution and arrangement, controlled size of both the fibers and the porosity provided by the fiber arrangement, improved flex life, dimensional stability and degradation resistance. Referring now to FIGS. 2 through 6, the metal fibers 14 have, as discussed above, a rough outer surface 15 which is preferably unmachined and unburnished as more clearly shown in FIG. 4. The opposite ends 16 and 17 of the fiber may be tensilely broken so as to provide tapering end portions 18. As shown in FIGS. 5 and 6, the mid-portion 19 of the fibers may be curled or twisted in a plurality of directions with the different curls having mutually nonparallel axes. Intermediate the ends 16 and 17, the fibers preferably have a substantially uniform cross-section. The fibers herein have a staple fiber length of at least approximately two inches, the staple fiber length being defined herein as the upper half mean of the array of all the fiber lengths.

The tensile breaking of the filmanets causes the ends 16 and 17 to be notched as shown in FIG. 5. However, it is also contemplated within the scope of the invention that the fibers may be provided by cutting metal filaments to the desired staple lengths. In providing the fibers by cutting them from metal filaments, the fibers may be supported by surrounding matrix material during the cutting operation.

Referring now to FIGS. 7 through 10, one preferred method of forming the fibers 14 is shown to comprise the steps of providing a plurality of metal rods 20 in a matrix 21 to define a billet 22. The billet is then reduced in diameter by a suitable constricting step, such as a wire drawing step as illustrated in FIG. 7, to provide a reduced diameter composite 23. The composite 23 may be further reduced in diameter as by further drawing steps until the rods 20 define filaments 27 having a diameter of under approximately 50 microns. Illustratively, the rods 20 may be formed of stainless steel and the matrix 21 may be formed of Monel metal with the diameter of the filaments 27 being approximately 12 microns in the final draw.

When the composite 23 has been reduced to the desired final diameter, the matrix material 21 is removed so as to leave the filaments 27 in the form of a tow. The removal of the matrix may be effected by any suitable means. Illustratively, where the filaments are stainless steel and the matrix material is Monel metal, the matrix may be removed by leaching with a suitable acid such as nitric acid. As illustrated in FIG. 9, the composite 23 may be arranged in the form of a spool to be submerged in the nitric acid 25 in a suitable tank 26.

As shown in FIG. 10, the resultant tow 24 is comprised of a plurality of continuous filaments 27 in generally parallel arrangement. The filaments may be provided with zero twist as shown in FIG. 10, or any suitable twist as desired, such as the conventional yarn producer's twist of one-fifth of a turn per inch for facilitated handling of the tow 24. In forming the continuous filaments 27 by the above described drawing process, the filaments may have relatively long lengths such as over 50 feet. For use in the metal structure 10, the fialments are preferably converted into suitable staple length fibers which may range from one-half to six inches, such as the two inch staple fibers discussed above.

One method of forming the staple fiber is to break the filaments to form a continuous band of the broken fibers commonly called a sliver, such as sliver 28 illustrated in FIG. 12. A method of forming the sliver 28 from the tow 24 is illustrated in FIG. 11 wherein the continuous filament tow 24 is fed through a breaking apparatus including a plurality of in-feed rollers 29, a plurality of intermediate section rollers 30, heater means 31 for heating the tow as it passes around the rollers 30, breaker bars 32, front rolls 33, and a crimper means 34. As shown in FIG. 11, the tow 24 remains unbroken up to the breaker bars 32. The front rolls 33 are driven at a rate higher than the intermediate rolls to provide a draft such as in the range of approximately 2½ to 7½. The respective filaments 27 of the tow 24 are thereby subjected to a tension. The breaker bars deflect the filaments from their normal straight line arrangement so that the different filaments break along different positions of the tow 24 whereby the continunity of the band is maintained while yet the individual filaments are broken to staple lengths to form the sliver 28. The sliver 28 as indicated above may be further formed as by crimping in apparatus 34 to form a crimped sliver 35 for facilitated subsequent handling.

Figure 14:
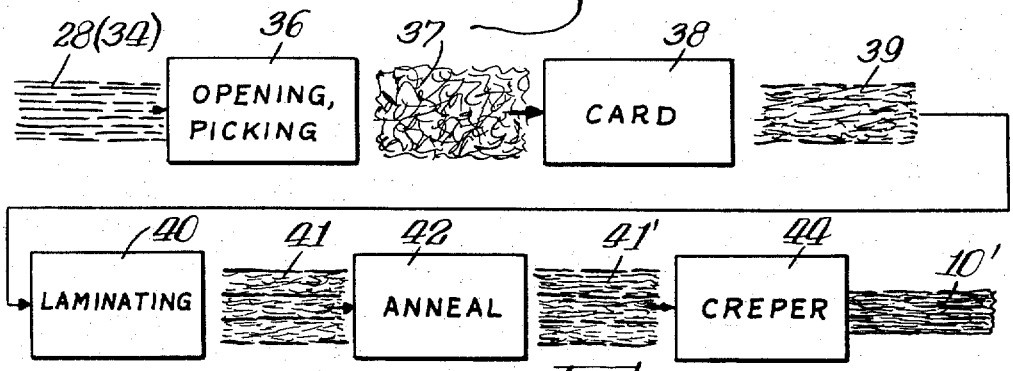
FIG. 14 is a schematic block diagram illustrating another method of forming a porous metal structure from the fibers of FIG. 12.
Figure 15:
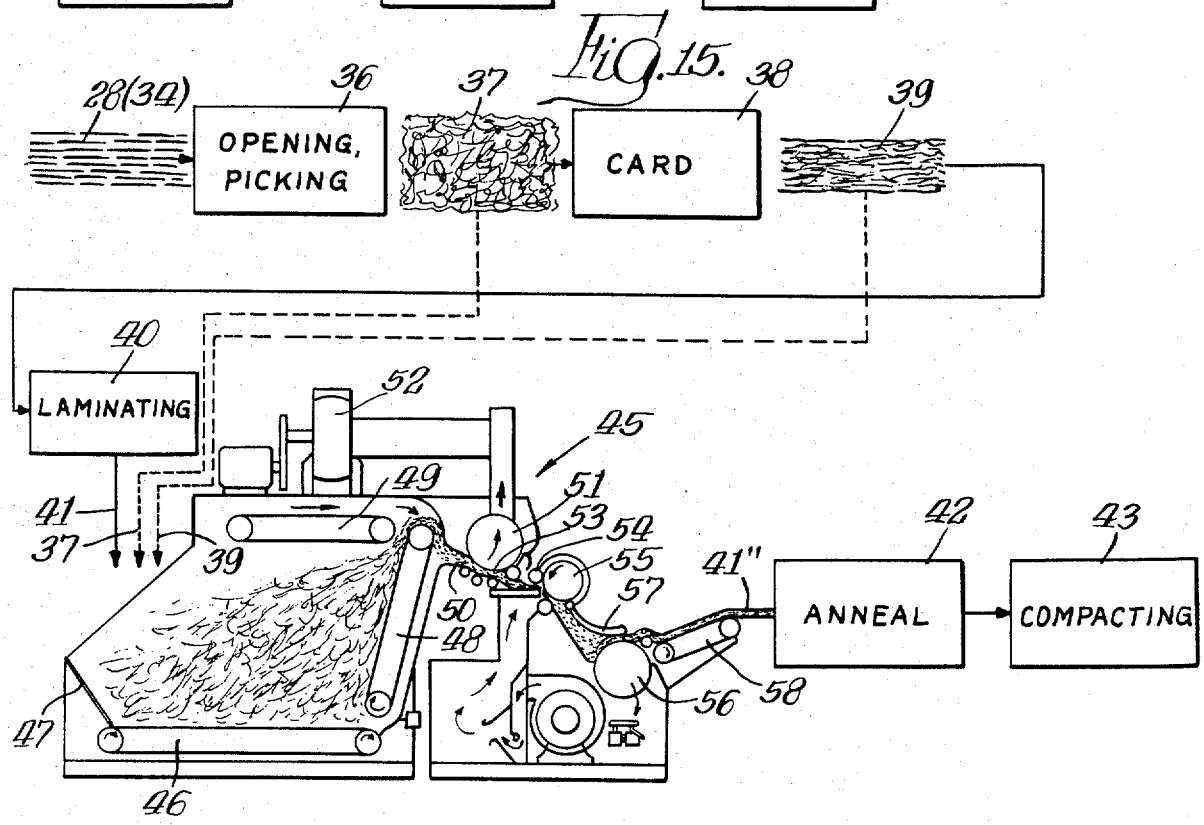
FIG. 15 is a schematic block diagram of still another method of forming a porous metal structure from the fibers of FIG. 12.

The sliver 28 is formed into the final porous metal structure by firstly opening and picking the sliver, as illustrated in the several forming methods illustrated in FIGS. 13 through 15. It has been found that by making the metal fibers of sufficiently small size as discussed above such as under 50 microns that conventional textile apparatus 36 for opening and picking the sliver fibers may be employed to provide a bulk picked mass of fibers 37. The bulk fibers may then be fed behind a conventional textile card, or garnet, to form a sheet, or card web, 39. A plurality of the card webs 39 may then be laminated in a suitable textile laminating apparatus 40 to form a laminated metal fiber structure 41. The laminated metal fiber structure 41 may be suitably annealed in conventional annealing apparatus 42 if desired and compacted in a conventional compacting apparatus 43 to provide the final laminated porous metal structure 10.

The density of the fibers in sheet 39 may be controlled by the rate of fiber input and by the selection of suitable card settings. In laminating the sheets 39, they may be cross-laid or parallel laid as desired. Thus, while the carding operation effectively randomizes the fiber in the sheet 39, there is a slight machine direction to the orientation, that is there is a tendency for some preponderance of the fibers to extend in the direction of movement through the card machine. While the fibers in sheet 39 generally extend parallel to the plane of the sheet depending upon the cold work condition of the metal fibers in the picked bulk portion 37, a small amount of curl is developed in the fibers as they are drafted over the card clothing. It has been found that such carding causes the individual metal fibers to be curled in a plurality of directions, the curls having mutually nonparallel axes as shown in FIGS. 5 and 6. The laminated fiber sheets 41 may be annealed as indicated above, if desired, to allow the fibers to take a new permanent set at a lower yield point and reduce their compressional resilience. For example, where the fibers are formed of 304 stainless steel, the annealing may be effected in an inert atmosphere at a temperature of roughly 1950° in apparatus 42. The compacting apparatus may comprise, for example, a platen press. By suitably controlling the compacting, an improved metal fiber structure 10 is provided having a high selected fiber density, selected sheet thickness and reduced pore size, high ratio of fiber surface area to volume of the structure 10, and controlled void percentage. The fibers effect a mechanical interlocking between themselves as a result of the curled arrangement thereof and their relatively rough surface characteristics. The fibers effectively comprise unburnished, unmachined fibers as formed by the above discussed multiple end drawing process.

In FIG. 14, a modified method of practicing the invention in forming a porous metal structure 10′ is shown to be generally similar to the method shown in FIG. 13, except for the substitution of a creper apparatus 44 for the compacting apparatus 43. Illustratively, creper apparatus 44 may comprise a conventional paper micro-creper, such as the micro-creper manufactured by the Bird Machine Company of Walpole, Mass. Such creper apparatus effectively crinkles the laminated web and effectively increases the multidirectional tensile, or burst, strength of the web. Further, the creped web 10′ has a substantially increased extensibility, with the specific amount of extensibility being controlled by the amount of areal reduction effected in the creper 44. As discussed above, the individual fibers of the laminated web 41 (and the annealed laminated web 41′ where the annealing apparatus 42 is employed) extend generally parallel to the plane of the web so that the rough frictional characteristics of the fibers tends to hold them in the compacted state resulting from the creping operation whereby an effectively irreversible compacting occurs providing the desired reduced area and thickness of the metal structure 10′.

If desired, the structure 10′ may be returned into the creper 44 crosswise to the original direction of creping so that a further creping or compacting may be effected at right angles to the original creping. Illustratively, where the fibers are formed of 304 stainless steel, a total reduction in area of the web 41 of as much as 90% may be effected by such double right angle creping.

Turning now to FIG. 15, a further modified method of forming a porous metal structure, such as porous metal structure 10, is shown to comprise a method generally similar to that of FIG. 13, but wherein an air lay apparatus 45 is provided which effectively randomizes the fiber arrangement in the output web 41. As shown in FIG. 15, the bulk fibers 37 may be delivered to the air lay apparatus 45, or may be passed through the card 38 and the resultant card web 39 delivered to the air lay apparatus 45, or the card webs 39 may be firstly laminated and then delivered to the air lay apparatus. The air lay apparatus 45 may be any conventional air lay apparatus well known to those in the art, one example thereof being shown in FIG. 15 as the Rando-Feeder-Webber apparatus manufactured by the Curlator Corporation. Briefly, the apparatus includes a delivery apron 46 at the bottom of a hopper 47 in which the fibers 37, 39, or 41, as discussed above, are placed. An elevating apron 48 takes the fibers upwardly to a stripper apron 49 which forms tufts for delivery to an air bridge 50 conducting the fibers against a feed mat condenser screen 51. A suction fan 52 holds the fibers against the screen where they are compacted by a subjacent roller conveyor 53 and delivered past a feed roll 54 and a licker-in 55 to a condenser 56 against which the fibers are conducted by a cover 57 in the form of a web 41'' carried on a delivery conveyor 58 from the air lay apparatus 45. As in the previously indicated processes the web 41'' may be annealed by a suitable annealing apparatus 42 if desired before delivery thereof to the compacting apparatus 43 (or creper 44 as desired).

Figure 16:
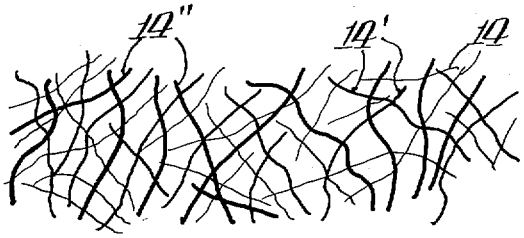
FIG. 16 is a side elevation of a porous metal structure formed of metal fibers having different diameter.
Figure 17:
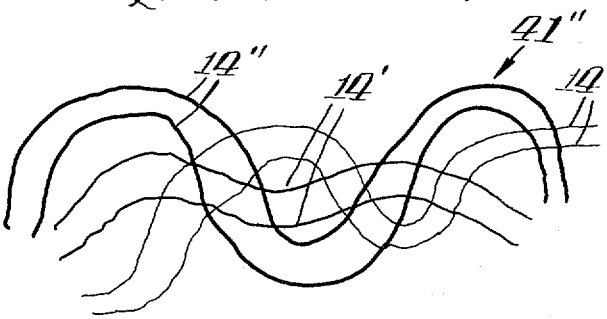
FIG. 17 is a side elevation of a porous metal structure having fibers of different diameters generally arranged in different layers.

In certain instances, it is desirable to provide the fibers 14 of the porous metal structure 10 in different diameters. Thus, for example, as shown in FIG. 16, a blend of different diameter fibers 14, 14', 14'', etc., may be provided by suitably delivering slivers 28 of different diameter staple fibers to the picking apparatus 36. In FIG. 17, a different arrangement of the different diameter fibers is illustrated wherein different size fibers are provided in different layers of the laminated web 41''.

Figure 18:
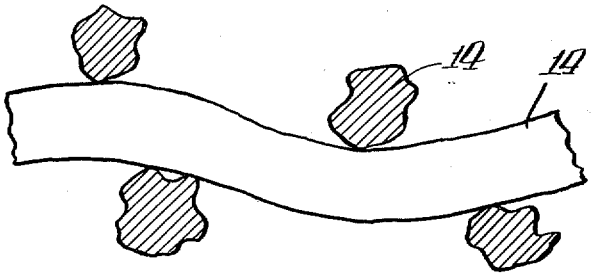
FIG. 18 is an enlarged elevation of a porous metal structure illustrating the contacting of the fibers one with the other at essentially point contacts.

As shown in FIG. 18, the individual fibers 14 extend randomly so as to engage each other in point contacts. As shown in FIGS. 17 and 18 the point contact of the fibers is substantially a tangential relationship where the fibers engage each other. The roughness and the curled arrangement of the fibers 14, as indicated above, cause an effectively positive mechanical interlocking between the fibers in the resultant structure notwithstanding the limited contact between the individual fibers.

Figure 19:
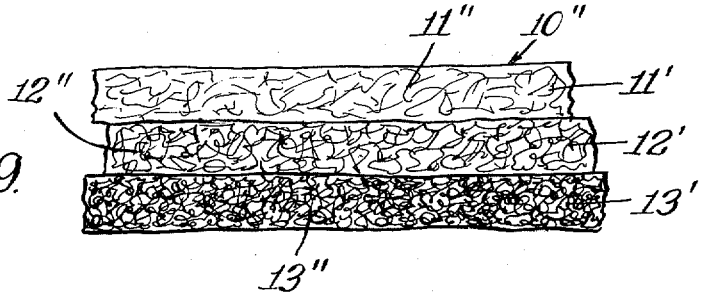
FIG. 19 is a side elevation of a porous metal structure wherein the fibers are arranged in a plurality of layers wherein the fibers of the different layers vary in size.
Figure 20:
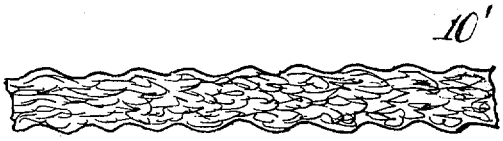
FIG. 20 is a side elevation of a creped porous metal structure embodying the invention.

In addition to varying the arrangement of the porous metal structure by varying the diameters of the individual fibers thereof as disclosed relative to FIGS. 16 and 17, the metal structure may be controlled as to pore size in different portions thereof, such as in the structure 10'' illustrated in FIG. 19. Thus, different layers 11', 12' and 13' of fiber webs may be laminated, with the different layers having different pore sizes, such as pore sizes 11'', 12'' and 13'' in the layers 11', 12' and 13', respectively. Thus, for example, the structure 10'' may be utilized as a filter structure wherein the pore size varies, e.g., decreases, in the direction of fluid flow therethrough.

Figure 21:
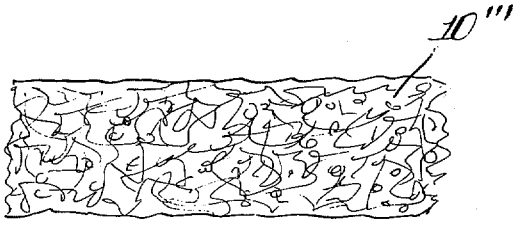
FIG. 21 is a side elevation of an uncompacted porous metal structure embodying the invention.

In certain instances, it may be desirable to provide the metal structure in an uncompacted form. Illustratively, as shown in FIG. 21, a metal structure 10''' embodying the invention is shown to comprise a random fiber web arrangement which, for example, may correspond to the web 41'' illustrated in the process of FIG. 15.

The different porous metal structures discussed above may be utilized in many different applications such as in filter media including biological filter media of extremely small pore size, thermal insulation, vibration isolators, abrasives, reinforcement materials for reinforcing weak matrical materials such as elastomers, plastics, other metals, glass, ceramic materials, etc., ion propulsion devices, battery electrodes, fuel cell electrodes, gas separation media, fractionating columns, spinnerettes, atomizing devices, structural elements such as aircraft elements, transpirational cooling devices, printing media, electron tubes, electrode structures, display devices utilizing phosphorescent materials in the pores thereof, laminates with other fibers and sheets of material, etc.

In the illustrated embodiments of the invention, the metal fibers of the slivers 28 may be provided with relatively high degrees of cold working, and in the illustrated embodiment, may be at least approximately 85% cold worked. The forming of the porous metal structures from fibers having diameters of as small as 4 microns, both annealed and unannealed, has indicated that excellent porous metal structures may be produced in accordance herewith. The felt arrangement of the fibers in the porous metal structures provides an improved porous metal structure providing highly desirable advantages in many applications, such as those discussed above. The small size of the individual fibers permits the porous metal structure to define a flexible sheet which may be folded on itself without breakage of the individual fibers. Thus, the porous metal structure may comprise a drapable sheet. Where extensibility is desired in the application, a creped sheet may be employed with control of the degree of creping providing a preselected desired resilient extensibility.

While I have shown and described certain embodiments of my invention, it is to be understood that it is capable of many modifications. Changes, therefore, in the construction and arrangement may be made without departing from the spirit and scope of the invention as defined in the appended claims.

I claim:

[ 1. A porous metal web structure comprising a plurality of substantially fracture free unmachined and unburnished staple length metal fibers each having a maximum cross-section dimension of less than 50 microns, said fibers having rough outer surfaces and being interlocked in an intermingled relationship substantially solely by means of said rough outer surfaces thereof in frictional engagement. ]

[ 2. The metal structure of claim 1 wherein the individual fibers are curled in a plurality of directions. ]

[ 3. The metal structure of claim 1 wherein the individual fibers are provided with a plurality of curls having mutual nonparallel axes. ]

[ 4. The metal structure of claim 1 wherein the fibers comprise a card web. ]

[ 5. The metal structure of claim 1 wherein the fibers comprise a plurality of superposed interlocking card webs. ]

[ 6. The metal structure of claim 1 wherein the individual fibers comprise fibers which are in an approximately 85 percent cold worked state. ]

[ 7. The metal structure of claim 1 wherein the fibers have high compressional resilience. ]

[ 8. The metal structure of claim 1 wherein the fibers comprise stress relieved fibers. ]

[ 9. The metal structure of claim 1 wherein the fibers have a cross-section as small as 4 microns. ]

[ 10. The metal structure of claim 1 wherein the fibers have substantially uniform cross-section between their ends ]

[ 11. The metal structure of claim 1 wherein the fibers are substantially similar in cross-sectional area. ]

[ 12. The metal structure of claim 1 wherein the fibers have preselected different cross-sectional areas. ]

[ 13. The metal structure of claim 1 wherein the fibers are provided in layers with the fibers of the respective layers having different preselected cross-sectional areas. ]

[ 14. The metal structure of claim 1 wherein the fibers engage each other substantially tangentially. ]

[ 15. The metal structure of claim 1 wherein the fibers engage each other with substantially only point contacts. ]

[ 16. The metal structure of claim 1 wherein the fibers are provided in layers with the fibers of successively different layers having progressively smaller cross-sectional areas. ]

[ 17. The metal structure of claim 1 wherein the fibers are provided in layers with the interstices between fibers of the respective layers having different cross-sectional areas. ]

[ 18. The metal structure of claim 1 wherein the fibers have an average length of at least approximately two inches. ]

[ 19. The metal structure of claim 1 wherein the fibers are arranged in a compacted arrangement. ]

[ 20. The metal structure of claim 1 wherein the fibers are disposed in a felt arrangement. ]

[ 21. The metal structure of claim 1 wherein the metal structure is creped to have a preselected resilient extensibility. ]

[ 22. The metal structure of claim 1 wherein the structure comprises a pliable sheet. ]

[ 23. The metal structure of claim 1 wherein the structure comprises a flexible sheet capable of being folded on itself without breakage of said fibers. ]

[ 24. The metal structure of claim 1 wherein the structure comprises a drapable sheet. ]

[ 25. The metal structure of claim 1 wherein the fibers are provided with niched ends. ]

[ 26. The metal structure of claim 1 wherein the fibers comprise tension broken staples. ]

[ 27. The metal structure of claim 1 wherein said web structure comprises air laid fibers. ]

[ 28. The metal structure of claim 1 wherein said fibers comprise annealed fibers. ]

[ 29. The metal structure of claim 1 wherein the ends of said fibers are free of hooks. ]

[ 30. A staple metal fiber having a fracture free unmachined and unburnished outer surface, said fiber having an effective diameter of less than 50 microns, a substantially uniform cross-section, and hook free ends. ]

[ 31. The staple metal fiber of claim 30 wherein there is a plurality of staple fibers. ]

[ 32. The staple metal fiber of claim 30 wherein said hook free ends comprise cut ends. ]

[ 33. The staple metal fiber of claim 30 wherein said hook free ends are tensilely broken ends. ]

[ 34. The staple metal fiber of claim 30 wherein said hook free ends are tapered. ]

[ 35. The staple metal fiber of claim 30 wherein said hook free ends are substantially frustoconical. ]

*36. A porous metal web structure comprising a plurality of substantially fracture free unmachined and unburnished staple length metal fibers each having a maximum cross-section dimension of less than 50 microns, said fibers having rough outer surfaces and being interlocked in an intermingled relationship substantially solely by means of said rough outer surfaces thereof in frictional engagement, said fibers each provided with niched ends.*

*37. A porous metal web structure comprising a plurality of substantially fracture free unmachined and unburnished staple length metal fibers each having a maximum cross-section dimension of less than 50 microns, said fibers having rough outer surfaces and being interlocked in an intermingled relationship substantially solely by means of said rough outer surfaces thereof in frictional engagement, said fibers each provided with tension broken ends.*

* * * * *